US009727046B2

United States Patent
Luo et al.

(10) Patent No.: US 9,727,046 B2
(45) Date of Patent: Aug. 8, 2017

(54) SYSTEM FOR MONITORING OR CONTROLLING A REMOTE PROGRAMMABLE DEVICE BY CONFIGURING A RECONFIGURABALE RECORD STORED ON A SERVER BY A LOCAL COMPUTING DEVICE

(71) Applicants: Gangming Luo, Middle Village, NY (US); Jonathan J. Kaufman, Brooklyn, NY (US)

(72) Inventors: Gangming Luo, Middle Village, NY (US); Jonathan J. Kaufman, Brooklyn, NY (US)

( * ) Notice: Subject to any disclaimer, the term of this patent is extended or adjusted under 35 U.S.C. 154(b) by 349 days.

(21) Appl. No.: 14/625,691

(22) Filed: Feb. 19, 2015

(65) Prior Publication Data

US 2016/0246275 A1    Aug. 25, 2016

(51) Int. Cl.
*G05B 19/42* (2006.01)
*G05B 19/18* (2006.01)
(Continued)

(52) U.S. Cl.
CPC ..... *G05B 19/0426* (2013.01); *G05B 19/0423* (2013.01); *G05B 2219/21086* (2013.01); *G05B 2219/21122* (2013.01)

(58) Field of Classification Search
CPC .................................................. G05B 19/056
(Continued)

(56) References Cited

U.S. PATENT DOCUMENTS 5,586,174 A * 12/1996 Bogner ............... H02J 13/0024
340/533
6,792,321 B2 * 9/2004 Sepe, Jr. ................. G05B 15/02
700/19
(Continued)

FOREIGN PATENT DOCUMENTS

CN          1656661 A       8/2005
EP          1370025 A1     12/2003
(Continued)

OTHER PUBLICATIONS

International Search Report issued in corresponding International (PCT) Patent Application No. PCT/US2016/018365 (May 23, 2016).
(Continued)

*Primary Examiner* — Suresh Suryawanshi
(74) *Attorney, Agent, or Firm* — Reising Ethington P.C.

(57) ABSTRACT

A system for monitoring or controlling a remote programmable device is provided. The system includes a server configured for connection to the programmable device and a local computing device. The server includes code that establishes a data structure accessible by both devices and including a plurality of user configurable records. The server receives instructions from the local device to configure each record as an input, output or input/output channel corresponding to input, output or input/output parameters of the programmable device and to define input values for the input channels and input/output channels. The server transmits the input values and input/output values to the programmable device and receives output values and input/output values
(Continued)

from the programmable device for transmission to the local computing device.

21 Claims, 5 Drawing Sheets

(51) Int. Cl.
*G06F 19/00* (2011.01)
*G05B 19/042* (2006.01)

(58) Field of Classification Search
USPC .......................................................... 700/87
See application file for complete search history.

(56) References Cited

U.S. PATENT DOCUMENTS

| | | | | |
|---|---|---|---|---|
| 7,468,676 | B2* | 12/2008 | Styers | G05B 9/02 340/3.1 |
| 7,941,786 | B2* | 5/2011 | Scott | H04N 5/4403 707/770 |
| 8,027,809 | B2* | 9/2011 | Brown | B25F 5/00 702/1 |
| 8,239,922 | B2* | 8/2012 | Sullivan | F24F 11/0009 236/51 |
| 2009/0099668 | A1 | 4/2009 | Lehman et al. | |
| 2011/0261206 | A1* | 10/2011 | Thomas | G05B 15/02 348/159 |
| 2013/0035086 | A1* | 2/2013 | Chardon | H04N 21/00 455/420 |
| 2015/0295886 | A1* | 10/2015 | Luo | H04L 67/141 709/219 |

FOREIGN PATENT DOCUMENTS

| | | |
|---|---|---|
| WO | 2014109710 A1 | 7/2014 |
| WO | 2014124490 A9 | 8/2014 |

OTHER PUBLICATIONS

Written Opinion issued in corresponding International (PCT) Patent Application No. PCT/US2016/018365 (May 23, 2016).

La Crosse Technology Ltd., "La Crosse Alerts PWS User Guide for Displays With Gateway" (exact publication date unknown, but prior to Feb. 19, 2015).

\* cited by examiner

Home  *iGPIO*  Resource

| Device Manager | Account Settings | Func Manager | Sign out | William |

(Free)

Device #1 last update is 7 seconds ago.
For another device, click on 'Device Manager' button.

Refresh

| CH | Label | Value | Value 2 | Value 3 | Flag | Enable | Update Time |
|---|---|---|---|---|---|---|---|
| 1 | LED-Red | 1.000 | 0.000 | 0.000 | 2 | ☑ | 2015-02-17 14:43:51 |
| 2 | LED-Green | 0.000 | 0.000 | 0.000 | 2 | ☑ | 2015-02-17 14:43:54 |
| 3 | Office-1_Temp | 78.2375 | 74.000 | 78.000 | 0 | ☑ | 2015-02-17 14:45:04 |
| 4 | Office-2_Temp | 78.8 | 0.000 | 0.000 | 0 | ☑ | 2015-02-17 14:45:04 |
| 5 | label | 0 | 0 | 0 | 1 | ☐ | N/A |

Update

Help on Device Parameters

Home  *iGPIO*  Resource

| Device Manager | Account Settings | Func Manager | Sign out | William |

(Free)

Following is a list of Device(s) for this account. You may enable a device, set a device's global parameters and/or select a device on which you want to edit it's parameters.

Refresh

| D# | Token | CHmax | Name | Update Interval | Mail Interval | D Mail Interval | Alert Delay | Enable | Open |
|---|---|---|---|---|---|---|---|---|---|
| 1 | 0 | 5 | Temp | 300 | 3600 | 21600 | 0 | Active | Open #1 |

Update

Help on Device Manager (General) Parameters

FIG. 3

Home  iGPIO  Resource

| Device Manager | Account Settings | Func Manager | Sign out | William |

(Free)

Following is a list of function(s) for this account. You may enable a function, set a function's global parameters and/or select a function on which you want to edit it's parameters. — 32

| Refresh | | | | | | |
|---|---|---|---|---|---|---|
| Func | Name | Points | Flag | Hits Allowed | Expires | Enable | Open |
| 1 | info | 25 | 0 | 5 | 2015-03-18 | Active | Open #1 |
| Update | | | | | | |

Help on Function (General) Parameters

FIG. 4

Home  iGPIO  Resource

| Device Manager | Account Settings | Func Manager | Sign out | William (Free) |

Function #1, Page #1/1
For another function, click on 'Func Manager' button.

| Refresh | First | Refresh | Refresh | Last |
|---|---|---|---|---|

| Point | X | Y |
|---|---|---|
| 1 | 0 | 0 |
| 2 | 0 | 0 |
| 3 | 0 | 0 |
| 4 | 0 | 0 |
| 5 | 0 | 0 |
| 6 | 0 | 0 |
| 7 | 0 | 0 |
| 8 | 0 | 0 |
| 9 | 0 | 0 |
| 10 | 0 | 0 |
| 11 | 0 | 0 |
| 12 | 0 | 0 |
| 13 | 0 | 0 |
| 14 | 0 | 0 |
| 15 | 0 | 0 |
| 16 | 0 | 0 |
| 17 | 0 | 0 |
| 18 | 0 | 0 |
| 19 | 0 | 0 |
| 20 | 0 | 0 |
| 21 | 0 | 0 |
| 22 | 0 | 0 |
| 23 | 0 | 0 |
| 24 | 0 | 0 |
| 25 | 0 | 0 |

~28

Update

To insert a data block into above table, please paste data X Y in the following area, then click on 'Insert' button.

~30

Insert

Help on Function Parameters

FIG. 5

SYSTEM FOR MONITORING OR CONTROLLING A REMOTE PROGRAMMABLE DEVICE BY CONFIGURING A RECONFIGURABALE RECORD STORED ON A SERVER BY A LOCAL COMPUTING DEVICE

BACKGROUND OF THE INVENTION a. Field of the Invention

This invention relates to a system for monitoring or controlling a programmable device. In particular, this invention relates to a system for monitoring or controlling a remotely located programmable device from a local computing device over a network.

b. Background Art

Many integrated circuits used to perform multiple functions include one or more pins or terminals that function as general purpose input/output pins. A user can control the behavior of these pins including whether the pins function as an input or an output. As a result, a single integrated circuit such as a microprocessor can be integrated into larger systems and used in a wide variety of applications. General purpose input/output pins may be used by a programmer, for example, to obtain specific inputs for a program installed on a microprocessor or to allow the program to control another device.

Controlling, and modifying, the behavior of general purposes input/output pins on an integrated circuit requires a user to access and modify programs that control the operation of the pins. This has typically required users to have direct access to a device containing the integrated circuit. This type of access, however, is frequently not available or inconvenient.

The inventors herein have recognized a need for a system for monitoring or controlling a remote programmable device that will overcome one or more of the above-identified deficiencies.

BRIEF SUMMARY OF THE INVENTION

A system for monitoring or controlling a programmable device is provided. In particular, a system is provided for monitoring or controlling a remotely located programmable device from a local computing device over a network.

A system for monitoring or controlling a remote programmable device in accordance with one embodiment of the invention includes a server configured for connection to the remote programmable device over a first network and to a local computing device over a second network. The server has a computer program encoded thereon including code for establishing a data structure accessible by the remote programmable device and by the local computing device. The data structure includes a plurality of user reconfigurable records for the remote programmable device. The program further includes code for receiving, from the local computing device, instructions to configure one or more of the plurality of user reconfigurable records for the remote programmable device. The instructions designate each of the one or more of the plurality of user reconfigurable records for the remote programmable device as an input channel corresponding to an input parameter of the remote programmable device, an output channel corresponding to an output parameter of the remote programmable device, or an input/output channel corresponding to an input/output parameter of the remote programmable device. The instructions also define, for each input channel, a first input value for the corresponding input parameter of the remote programmable device and, for each input/output channel, a first input/output value for the corresponding input/output parameter of the remote programmable device. The program further includes code for transmitting, for each of the one or more of the plurality of user reconfigurable records for the remote programmable device designated as an input channel, the first input value for the corresponding input parameter to the remote programmable device and, for each of the one or more of the plurality of user reconfigurable records for the remote programmable device designated as an input/output channel, the first input/output value for the corresponding input/output parameter to the remote programmable device. The program further includes code for receiving, for each of the one or more of the plurality of user configurable records for the remote programmable device designated as an output channel, a first output value for the corresponding output parameter from the remote programmable device and, for each of the one or more of the plurality of user reconfigurable records for the remote programmable device designated as an input/output channel, a second input/output value for the corresponding input/output parameter from the remote programmable device.

A system for monitoring or controlling a remote programmable device in accordance with the present teachings is advantageous relative to conventional systems because the inventive system permits a user to control, monitor, and modify the use of, general purpose input/output pins on a circuit of a programmable device remotely. As a result, the inventive system improves the utility of such devices.

The foregoing and other aspects, features, details, utilities, and advantages of the present invention will be apparent from reading the following description and claims, and from reviewing the accompanying drawings.

BRIEF DESCRIPTION OF THE DRAWINGS

FIG. 2-5 are screen displays of a graphical user interface generated by the system of FIG. 1.

DETAILED DESCRIPTION OF EMBODIMENTS OF THE INVENTION

Figure 1:
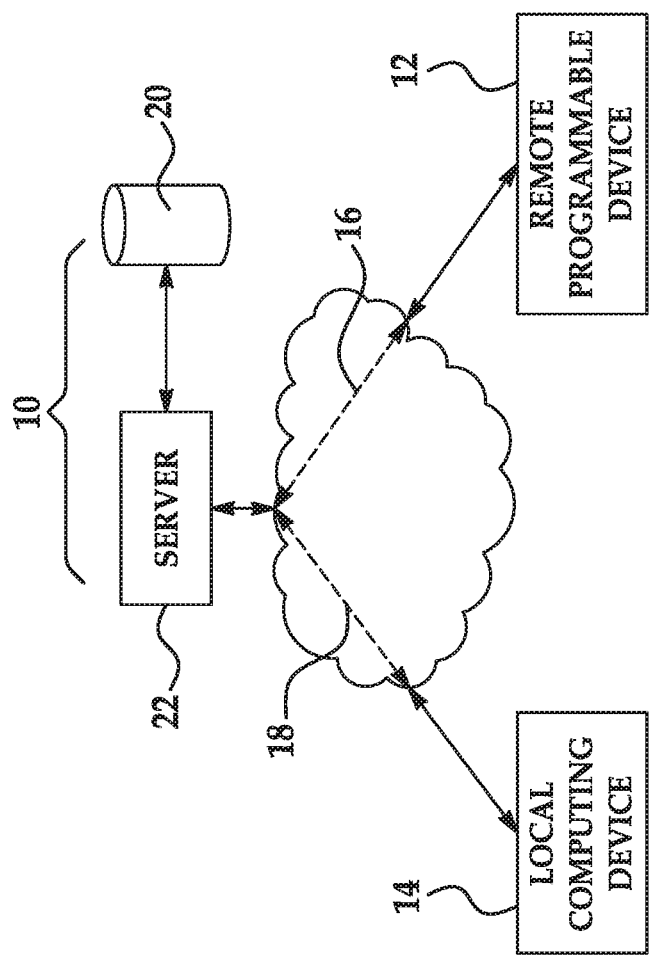
FIG. 1 is a diagrammatic view of a system for monitoring or controlling a remote programmable device in accordance with one embodiment of the present teachings.

Referring now to the drawings wherein like reference numerals are used to identify identical components in the various views, FIG. 1 illustrates one embodiment of a system 10 for monitoring or controlling a remote programmable device 12 in accordance with the present teachings. The system 10 enables device 12 to be monitored or controlled from a local computing device 14. As used herein, the term "remote" as applied to a device 12 indicates that the device is one which is monitored or controlled by a user indirectly over a telecommunications network. While one advantage of the present invention is to permit monitoring or control of devices 12 over large distances, "remote" does not imply any specific distance between device 12 and device 14. As used herein, the term "local" as applied to a device 14 indicates that that device is under direct control of a user using, for example, conventional input/output devices such as a keyboard or mouse. Devices 12, 14, may be connected to system 10 over networks 16, 18. System 10 may include a database 20 and a server 22.

Device 12 may comprise any of a wide variety of programmable devices. In one embodiment, device 12 comprises a sensor used to detect a condition and, in particular, a temperature sensor. In particular, device 12 may include a temperature sensor offered for sale under model number MCP9808 by Microchip Technology, Inc. of Chandler, Ariz., United States of America coupled to the single board computer offered for sale under the model name Raspberry Pi Model B by various companies including Newark Corporation of Chicago, Ill., United States of America. The device may be used, for example, to remotely monitor the temperature of a room in a house or of a refrigeration unit in a restaurant. In another embodiment, device 12 comprises a light or lamp used to illuminated a space. Although exemplary devices have been identified herein, it should be understood that device 12 may comprise any of a wide variety of devices including, but not limited to, conventional household appliances and fixtures.

Device 14 may comprise any of a wide variety of computing devices. As used herein, the term "computing device" is intended to refer to any machine that is configured to process data or information in accordance with a set of executable instructions. Accordingly, device 14 may comprise, for example, personal computers (including desktop, laptop and tablet computers), personal digital assistants, cellular communication devices (including "smartphones"), servers, routers or similar devices. Device 14 may include one or more programmable microprocessors and may include a central processing unit (CPU), memory, and one more input/output devices such as a keyboard, mouse, touch screen, display/monitor, camera, activators (e.g., switches, thermostats) and sensors (e.g., temperature, vibration, humidity). The displays may present a graphical user interface (GUI) to the user resulting in one or more of the screen displays described hereinbelow. Device 14 may further comprise a combination of two or more of such machines. Device 14 may be programmed in a conventional manner with various executable instructions (i.e. software) to perform a variety of tasks. In accordance with one aspect of the present invention, device 14 includes a web browser for requesting, obtaining and displaying information received over network 18 such as Internet Explorer by Microsoft Corp., Chrome by Google, Inc. or Firefox by Mozilla Corp. In another embodiment, device 14 includes a software application other than a web browser that is configured for direct communication with server 22 over network 18.

Networks 16, 18 establish communication links between devices 12, 14 and server 22 to enable an exchange of information between devices 12, 14 and server 22. Each of devices 12, 14 and server 22 may have a conventional network interface. Networks 16, 18 may each comprise portions of the public internet, a cellular telecommunications network, a local area network (LAN), wide area network (WAN), virtual private network (VPN) and/or other form of telecommunications network.

Database 20 provides data storage for server 22. Database 20 may employ a relational database management system (RDBMS) such as any of the open source systems MySQL, PostgreSQL, MariaDB, or the commercial systems SQL Server from Oracle Corp. or SQL Server from Microsoft Corp. Database 20 may be configured to provide a static and/or dynamic contact structure for server 22 and may be used to provide both intermediate information while server 22 executes operations and long-term storage of data. In accordance with one aspect of the invention, database 20 implements a data structure that includes a plurality of user reconfigurable records for device 12 as discussed in greater detail hereinbelow.

Server 22 provides a means for monitoring or controlling device 12 from device 14. As used herein, the term "server" refers to a computing device coupled to a telecommunications network and configured by programming instructions (i.e., software) to provide services to other computing devices (including other servers). The server may include an operating system such as one of the operating systems based on the Linux or UNIX operating systems. In addition, or as an alternative to database 20, server 22 may also include an internal memory or database that may employ a database management system (DBMS) such as any of the open source systems MySQL, PostgreSQL, MariaDB, or the commercial systems SQL Server from Oracle Corp. or SQL Server from Microsoft Corp. The memory or database may be configured to provide a static and dynamic contact structure for server 22 and used to provide both intermediate information while server 22 executes operations and long-term storage of data. Server 22 may further include applications that configure server 22 to perform specific functions based on the intended user of server 22. The applications may be implemented using software development components (e.g., C or C++) and scripting languages such as PHP, Perl, Python and RoR (Ruby on Rails) to provide required functionality. It should be appreciated that the server-side software can be implemented in a number of ways that are used to generate dynamic content on web pages and web applications, as for example using Common Gateway Interface (CGI). Server 22 may also include interfaces to provide a graphical and/or communications interface between server 22 and clients such as devices 12, 14. The interface may, for example, be configured to be hypertext transfer protocol (HTTP), eXtensible Markup Language (XML) or Simple Object Access Protocol (SOAP) compliant. It should be understood that these interfaces may employ query type protocols (e.g. HTML) to enable access by devices 12, 14 to server 22, but may also employ persistent (e.g. socket) connections between devices 12, 14 and server 22. Server 22 is configured for connection to device 12 over network 16 and to device 14 over network 18. In accordance with the present invention, server 22 may be configured (encoded) with programming instructions from a computer program (i.e. software) to perform various steps in a method for monitoring or controlling remote programmable device 12.

Server 22 may comprise a web server configured to generate a website with a graphical user interface (GUI) on a display associated with device 14. The GUI may be generated using browser based scripting languages such as Javascript, Dart SDK from Google, Inc., Script#, CoffeeScript, JSX or ECMAScript Harmony. A user of device 14 may use a web browser in a conventional manner to request and provide information from server 22. Alternatively, a user may use a software application on device 14 configured for direct connection to server 22 and to present a similar GUI to the user on device 14. Server 22 may also generate a graphical or non-graphical user interface for use by device 12. In one embodiment, communications are exchanged between device 12 and server 22 using the POST request-response method.

The computer program encoded on server 22 may include code for receiving authentication information and other information from the user of device 14 through the GUI. In accordance with one embodiment of the invention, the user may provide authentication information in the form of an electronic mail address and a password. Communications from device 12 may require the same authentication information (e.g., electronic mail address and password) used to permit access by device 14 in order to link devices 12, 14 to shared information on server 22. It should be understood that the type of information that may be entered, including the authentication information, may vary. For example, in some embodiments, server 22 may be configured to obtain and record an internet protocol address associated with each of devices 12, 14. One possible use of the internet protocol addresses is for server 22 to restrict subsequent access to information on server 22 to communications having the same internet protocol address. The program encoded on server 22 may therefore include code for obtaining an internet protocol address from one or both of devices 12, 14 when devices 12, 14 access server 22, code for storing the internet protocol address(es), and code for prohibiting subsequent access by devices 12, 14 unless the internet protocol address(es) in the subsequent requests for access equal the stored internet protocol address(es).

In accordance with one aspect of the present teachings, the program encoded on server 22 includes code for establishing a data structure accessible by remote programmable device 12 and by local computing device 14. The data structure may be implemented in database 20 or another memory including a memory of server 22. The data structure may include a plurality of user reconfigurable records for remote programmable device 12. The records are used to monitor and control device 12 and may contain informational data output by device 12 and control data that may be used to control device 12. The records are reconfigurable by devices 12, 14 and, as a result, enable general purpose input/output functionality for device 12 in a network environment.

Referring now to FIG. 2, in one embodiment the GUI generated by server 22 on device 14 may include a table 24 with a plurality of rows corresponding to the user reconfigurable records. It should be understood that a row in the table 24 of the GUI may or may not be coextensive with the user reconfigurable record stored in database 20 or another memory. In other words, the records may contain more or less information than is shown in the row of a table 24 in the GUI.

The program encoded on server 22 may include code for receiving instructions from device 14 to configure one or more of the plurality of user configurable records for device 12. In the illustrated embodiment, these instructions may be entered through the table 24 in the GUI. The instructions designate each of the records as an input channel corresponding to an input parameter for device 12, an output channel corresponding to an output parameter of device 12 or an input/output channel corresponding to an input/output parameter of device 12. For example, an input channel may correspond to the status of a light on a device 12 and may be used to turn a light on or off. An output channel may correspond to a temperature sensed by device 12 and may be used to display temperature values sensed by device 12. An input/output channel may correspond to the status of device 12 and may allow a user to turn off device 12 while also allowing the device 12 to reset the channel so that the device 12 is not automatically shut off the next time it is activated. In the illustrated embodiment, the user designates individual records by inserting a value in the column of table 24 labeled "Flag." In the illustrated embodiment, "0" indicates that a particular record corresponds to an output channel, "1" indicates that a particular record corresponds to an input/output channel, and "2" indicates that a particular record corresponds to an input channel.

The instructions received from device 14 may also define, for each input channel, an input value for the corresponding input parameter of device 12 and, for each input/output channel, an input/output value for the corresponding input/output parameter of device 12. In the illustrated embodiment, the rows labeled "1" and "2" in the table 24 shown in the GUI have been designated as input channels that correspond to the status (on or off) of a red LED and a green LED. An input value of "0.000" or "1.000" may be inserted by a user of device 14 in a column labeled "Value." Depending on the programming of device 12, these value will instruct device 12 to turn the corresponding LEDs on or off.

The program encoded on server 22 may further include code for transmitting values to device 12. In particular, the program encoded on server 22 may include code for transmitting input values for corresponding input parameters to device 12 for each user reconfigurable record designated as an input channel and input/output values for corresponding input/output parameters to device 12 for each user reconfigurable record designated as an input/output channel. In the illustrated embodiment, the values entered by the user in the column labeled "Value" for a record designated as an input or input/output channel may be transmitted by server 22 to device 12 for use in controlling device 12.

The program encoded on server 22 may further include code for receiving values from device 12. In particular, the program encoded on server 22 may include code for receiving output values corresponding to output parameters from device 12 for each user reconfigurable record designated as an output channel and input/output values for corresponding input/output parameters from device 12 for each user reconfigurable record designated as an input/output channel. In the illustrated embodiment, the rows labeled "3" and "4" in the table 24 shown in the GUI have been designated as output channels that correspond to the temperatures sensed by device 12 in two different locations. Output values corresponding to measured temperatures by device 12 are displayed in the column labeled "Value."

The program encoded on server 22 may further include code for receiving additional instructions from device 14 to further configure one or more of the user reconfigurable records designated as an output channel. These instructions may define values that are input to device 12 for use by device 12. In the illustrated embodiment, a user may insert input values in the columns labeled "Value 2" and "Value 3" in table 24. In the table illustrated in FIG. 2, input values have been inserted in the row labeled "3". The program encoded on server 22 may further include code for transmitting the input values to device 12. These values may be used, for example, to establish lower and upper threshold values for temperature with device 12 programmed to take some action (e.g. generating an alert as discussed below) if the measured temperature falls outside of the range defined by the upper and lower threshold values.

The program encoded on server 22 may further include code for receiving additional instructions from device 12 and/or device 14 for use in configuring the user reconfigurable records. For example, the program encoded on server 22 may include code for receiving a name for each record/channel from device 14. As illustrated in FIG. 2, a user may enter a device name in the column in table 24 labeled "Label." In this manner, the user is able to differentiate the records/channels so that the user enters appropriate values for any input channels or properly understands the meaning of the values of any output channel. The program encoded on server 22 may also include code allowing a user to control access to a record by device 12. In the illustrated embodiment, a user may check a box in the column labeled "Enable" in table 24 to permit device 12 to access the corresponding record. The program encoded on server 22 may also include code to indicate the time when a record was last modified by device 12 or 14. In the illustrated embodiment, this time may be shown in the column labeled "Updated Time" in table 24.

Referring now to FIG. 3, server 22 may be configured to receive additional instructions from device 14 to establish certain parameter values associated with the monitoring or control of device 12 through server 22. For example, the program encoded on server 22 may include code that allows a user to define a maximum number of user reconfigurable records for a device 12. Server 22 may generate a table 26 as part of the GUI displayed on device 14 for use in receiving these instructions. As illustrated in FIG. 3, a user may enter a number in the column labeled "CHmax" that defines the number of user reconfigurable records associated with a given device 12.

The program encoded on server 22 may also include code for receiving a device name for device 12 from device 14. As illustrated in FIG. 3, a user may enter a device name in the column labeled "Name" in table 26. The device name enables a user to identify among multiple devices 12.

The program encoded on server 22 may further include code for receiving, from device 14, instructions designating an update interval time. The update interval time represents a length of time following access of the user reconfigurable records by device 12 that must pass before device 12 can access the records again. In the illustrated embodiment, the user may enter the update interval time in the column labeled "Updated Interval" in table 26 with the unit of time being seconds. The program encoded on server 22 may further include code prohibiting access to the user reconfigurable records by device 12 until the update interval time has expired. In some cases, it may be desirable to permit access to the records by device 12 prior to the expiration of the update interval. For example, in the case of a temperature sensor monitoring refrigeration equipment, a sudden increase in temperature may warrant an immediate update to one of the records. Therefore, in one embodiment of the invention, the program encoded on server 22 may also include code for allowing access to the user reconfigurable records by device 12 before the update interval time has expired under predetermined circumstances. For example, where device 12 monitors temperature in a refrigeration unit, device 12 may be programmed to request immediate access to the user reconfigurable records if the temperature exceeds a predetermined threshold or is increasing at a rate above a predetermined threshold. In one embodiment, this access is allowed a limited number of times represented by a number under the column labeled "Token" in table 26. The program encoded on server 22 includes code that decreases this value each time access to a record is granted before the update interval time expires.

The program encoded on server 22 may further include code for receiving, from device 14, instructions designating a server communication interval time. The server communication interval time represents a length of time between communications generated by server 22 and transmitted by server 22 to device 14 or another local computing device if device 12 has failed to access server 22 and, in particular, the user reconfigurable records stored by server 22. In the illustrated embodiment, the user may enter the server communication interval time in the column labeled "Mail Interval" in table 26 with the unit of time being seconds. The program encoded on server 22 may include code for generating, and transmitting, a communication to device 14 or another local computing device if device 12 fails to access or otherwise communicate with server 22 over a predetermined period of time (e.g., the update interval referenced hereinabove). Thereafter, the program encoded on server 22 may include code for generating, and transmitting, another communication to device 14 or another local computing device if device 12 has still not accessed or otherwise communicated with server 22 following the server communication interval time. The communication may comprise an electronic mail, a text message or similar communication.

The program encoded on server 22 may further include code for receiving, from device 14, instructions designating a device communication interval time. The program encoded on server 22 may include code for sending communications to device 14 over network 18 or another local computing device over another network responsive to requests from device 12. Again, the communication may comprise an electronic mail, a text message or similar communication. The device communication interval time represents a length of time that must pass after server 22 sends a message responsive to a request from device 12 before server 22 will comply with another request from device 12 to send a message to device 14 or another local computing device. Thus, the program encoded on server 22 may also include code for denying a request from device 12 to send another communication to device 14 over network 18 or to another local computing device over another network until the device communication interval time has expired. In the illustrated embodiment, the user may enter the device communication interval time in the column labeled "D Mail Interval" with the unit of time being seconds. The code for sending communications to device 14 or another local computing device responsive to a request from device 12 may include code for forming the communication using information provided by device 12. In one embodiment, device 12 provides characters (e.g., text characters) for forming a subject line and a body of an electronic mail communication. In the case of a temperature sensor, the communications may be used to alert the user that the temperature has exceeded a predetermined threshold value (e.g., the numbers listed under "Value 2" or "Value 3" in FIG. 2 above) and/or advise the user of the measured temperature.

The program encoded on server 22 may further include code for receiving, from device 14, instructions designating a communication delay time and for transmitting a communication to device 14 over network 18 or another local computing device over another network if device 12 fails to communicate with server 22 over network 16 for a time greater than the updated interval time (discussed hereinabove) and communication delay time. As discussed hereinabove, the program encoded on server 22 may include code for generating, and transmitting, a communication to device 14 or another local computing device if device 12 fails to access or otherwise communicate with server 22 over a predetermined period of time (e.g., the update interval referenced hereinabove). This time may comprise the update interval time in some embodiments such that server 22 is configured to generate a communication if device 12 does not access server 22 at the update interval time. Alternatively, the user may enter a delay time such that server 22 generates a communication if device 12 does not access server 22 for some period of time following the update interval time. In the illustrated embodiment, the user may enter the communication delay time in the column labeled "Alert Delay" in table 26 with the unit of time being seconds.

Referring to FIG. 4, in accordance with another aspect of the present teachings, server 22 may be configured to store a function that may be downloaded and used by device 12. The program encoded on server 22 may include code for receiving, from device 14, instructions to configure a user reconfigurable function for device 12. Referring to FIG. 5, the instructions may include instructions for designating a plurality of values for an independent variable and a corresponding plurality of values for a dependent variable of the function. In the illustrated embodiment, server 22 may generate a table 28 as part of the GUI for device 14. A user may enter values for each variable individually in the columns labeled "X" and "Y in table 28 or may enter the values in a string in a predefined format in box 30 below table 28. The program encoded on server 22 may further include code for transmitting, to device 12, the plurality of values for the independent variable and corresponding plurality of values for the dependent variable.

Referring again to FIG. 4, the program encoded on server 22 may further include code for controlling use of the function by device 12 and for receiving instructions on use of the function from device 14. For example, the program encoded on server 22 may include code to receive, from device 14, a name for the function. A user may enter a name for the function using the GUI by entering a name in the column labeled "Name" in a table 32. In this manner, the user and device 12, are able to differentiate among multiple stored functions. The program encoded on server 22 may also include code permitting the user to designate the number of points (or coordinates) used to construct the function. In the illustrated embodiment, the user may enter the number of points using the GUI by entering a number in the column labeled "Points" in table 32. The program encoded on server 22 may include code establishing a maximum number of points for the stored function and may display this number as a default value in the column labeled "Points." The program encoded on server 22 may include code that restricts the user from entering a number greater than the maximum number of points allowed. The program encoded on server 22 may also include code permitting the user to control use of the function by device 12. In the illustrated embodiment, the user may enter a number controlling when the function is downloaded and/or executed using the GUI by entering a number in the column labeled "Flag" in table 32. For example, the user may enter the a numerical value representing the number of seconds between events when the function is downloaded and executed by device 12. The program encoded on server 22 may also include code permitting the user to designate the number of times the function may be downloaded and executed by device 12. In the illustrated embodiment, the user may enter the number of times the function can be downloaded by device 12 using the GUI by entering a number in the column labeled "Hits Allowed" in table 32. The program encoded on server 22 may again include code establishing a maximum number of times the function can be downloaded and may display this number as a default value in the column labeled "Hits Allowed". The program encoded on server 22 may include code that restricts the user from entering a number greater than the maximum number. The program encoded on server 22 may further include code establishing a time at which the function is no longer available for download by device 12. In the illustrated embodiment, this time may be displayed to a user of device 14 through the GUI in the column labeled "Expires" in table 32. The program encoded on server 22 may include code updating this time based on the occurrence of predetermined events including, for example, modification of the points of the function by the user. The program encoded on server 22 may include code that prohibits downloading of the function by device 12 if the time period has passed or that deletes values for the points of the function (such that the function is no longer usable by device 12).

A system 10 in accordance with the present invention is advantageous relative to conventional systems because the inventive system permits a user to control, monitor, and modify the use of, general purpose input/output pins on a circuit of a programmable device 12 remotely. As a result, the inventive system improves the utility of such devices.

While the invention has been shown and described with reference to one or more particular embodiments thereof, it will be understood by those of skill in the art that various changes and modifications can be made without departing from the spirit and scope of the invention.

We claim:

1. A system for monitoring or controlling a remote programmable device, comprising:
    a server configured for connection to said remote programmable device over a first network and to a local computing device over a second network, said server having a computer program encoded thereon including code for:
        establishing a data structure accessible by said remote programmable device and by said local computing device, said data structure including a plurality of user reconfigurable records for said remote programmable device;
        receiving, from said local computing device, instructions to configure one or more of said plurality of user reconfigurable records for said remote programmable device, said instructions designating each of said one or more of said plurality of user reconfigurable records for said remote programmable device as an input channel corresponding to an input parameter of said remote programmable device, an output channel corresponding to an output parameter of said remote programmable device, or an input/output channel corresponding to an input/output parameter of said remote programmable device, and define, for each input channel, a first input value for said corresponding input parameter of said remote programmable device and, for each input/output channel, a first input/output value for said corresponding input/output parameter of said remote programmable device;
        transmitting, for each of said one or more of said plurality of user reconfigurable records for said remote programmable device designated as an input channel, said first input value for said corresponding input parameter to said remote programmable device and for each of said one or more of said plurality of user reconfigurable records for said remote programmable device designated as an input/output channel, said first input/output value for said corresponding input/output parameter to said remote programmable device; and,
        receiving, for each of said one or more of said plurality of user reconfigurable records for said remote programmable device designated as an output channel, a first output value for said corresponding output parameter from said remote programmable device and, for each of said one or more of said plurality of user reconfigurable records for said remote programmable device designated as an input/output channel, a second input/output value for said corresponding input/output parameter from said remote programmable device.

2. The system of claim 1 wherein said code for establishing a data structure includes code for receiving, from said local computing device, a maximum number of said plurality of user reconfigurable records.

3. The system of claim 1 wherein said computer program further includes code for:
receiving, from said local computing device, instructions designating an update interval time; and
prohibiting access to said plurality of user reconfigurable records by said remote programmable device until said update interval time has expired.

4. The system of claim 1 wherein said computer program further includes code for:
receiving, from said local computing device, instructions designating an update interval time; and
allowing access to said plurality of user reconfigurable records by said remote programmable device before said update interval time has expired a limited number of times.

5. The system of claim 1 wherein said computer program further includes code for sending a first communication to said local computing device over said second network responsive to a request from said remote programmable device.

6. The system of claim 5 wherein said computer program further includes code for:
receiving, from said local computing device, instructions designating a device communication interval time; and,
denying a request from said remote programmable device to send a second communication to said local computing device over said second network until said device communication interval time has expired.

7. The system of claim 1 wherein said computer program further includes code for sending a first communication to another local computing device over a third network responsive to a request from said remote programmable device.

8. The system of claim 7 wherein said computer program further includes code for:
receiving, from said local computing device, instructions designating a device communication interval time; and,
denying a request from said remote programmable device to send a second communication to said another local computing device over said third network until said device communication interval time has expired.

9. The system of claim 1 wherein said computer program further includes code for:
receiving, from said local computing device, instructions designating an update interval time and a communication delay time; and
transmitting a communication to said local computing device over said second network if said remote programmable device fails to communicate with said server over said first network for a time greater than said update interval time and said communication delay time.

10. The system of claim 1 wherein said computer program further includes code for:
receiving, from said local computing device, instructions designating an update interval time and a communication delay time; and
transmitting a communication to another local computing device over a third network if said remote programmable device fails to communicate with said server over said first network for a time greater than said update interval time and said communication delay time.

11. The system of claim 1 wherein said computer program further includes code for:
receiving, from said local computing device, additional instructions to configure a first user reconfigurable record of said one or more of said plurality of user reconfigurable records for said remote programmable device, said first user reconfigurable record designated as an output channel and said additional instructions defining a second input value for said remote programmable device; and,
transmitting, said second input value to said remote programmable device.

12. The system of claim 1 wherein said computer program further includes code for:
receiving, from said local computing device, instructions to configure a user reconfigurable function for said remote programmable device, said instructions designating a plurality of values for an independent variable and a corresponding plurality of values for a dependent variable of said function; and
transmitting, to said remote programmable device, said plurality of values for said independent variable and said corresponding plurality of values for said dependent variable.

13. The system of claim 1 wherein said data structure is stored in a memory of said server.

14. The system of claim 1 wherein said remote programmable device comprises a sensor.

15. The system of claim 1 wherein said remote programmable device comprises a temperature sensor.

16. The system of claim 1 wherein said remote programmable device comprises a light.

17. The system of claim 1 wherein said computer program further includes code for providing access to said plurality of user reconfigurable records by said local computing device responsive to a first set of authentication information and to said remote programmable device responsive to a second set of authentication information and said first and second sets of authentication information are identical.

18. The system of claim 1 wherein said computer program further includes code for:
obtaining a first internet protocol address from said local computing device from said instructions to configure one or more of said plurality of user reconfigurable records; and
storing said first internet protocol address.

19. The system of claim 18 wherein said computer program further includes code for
prohibiting subsequent access to said plurality of user reconfigurable records by said local computing device unless a second internet protocol address provided by said local computing device equals said first internet protocol address.

20. The system of claim 1 wherein said computer program further includes code for:
obtaining a first internet protocol address from said remote programmable device; and
storing said first internet protocol address.

21. The system of claim 20 wherein said computer program further includes code for:
prohibiting subsequent access to said plurality of user reconfigurable records by said remote programmable device unless a second internet protocol address provided by said remote programmable equals said first internet protocol address.

\* \* \* \* \*